US012125294B2

(12) United States Patent
Yokoyama et al.

(10) Patent No.: US 12,125,294 B2
(45) Date of Patent: Oct. 22, 2024

(54) VEHICLE POSITION DETERMINATION DEVICE, VEHICLE POSITION DETERMINATION SYSTEM, AND VEHICLE POSITION DETERMINATION METHOD

(71) Applicant: DENSO CORPORATION, Kariya (JP)

(72) Inventors: Takahisa Yokoyama, Kariya (JP); Noriyuki Ido, Kariya (JP)

(73) Assignee: DENSO CORPORATION, Kariya (JP)

( * ) Notice: Subject to any disclaimer, the term of this patent is extended or adjusted under 35 U.S.C. 154(b) by 325 days.

(21) Appl. No.: 17/490,417

(22) Filed: Sep. 30, 2021

(65) Prior Publication Data

US 2022/0019819 A1 Jan. 20, 2022

Related U.S. Application Data

(63) Continuation of application No. PCT/JP2020/014173, filed on Mar. 27, 2020.

(30) Foreign Application Priority Data

Apr. 4, 2019 (JP) ................... 2019-071690

(51) Int. Cl.
*G06V 20/56* (2022.01)
*B60W 40/06* (2012.01)
*G06V 10/60* (2022.01)
*G06V 20/58* (2022.01)

(52) U.S. Cl.
CPC ........... *G06V 20/588* (2022.01); *B60W 40/06* (2013.01); *G06V 10/60* (2022.01); *G06V 20/582* (2022.01); *B60W 2552/35* (2020.02); *B60W 2552/53* (2020.02)

(58) Field of Classification Search
CPC ............. B60W 40/06; B60W 2552/35; B60W 2552/53; G01C 21/28; G01C 21/30; G06V 10/60; G06V 10/70; G06V 20/56; G06V 20/582; G06V 20/588
USPC ......................................... 382/104
See application file for complete search history.

(56) References Cited

U.S. PATENT DOCUMENTS 6,091,833 A * 7/2000 Yasui ................... G05D 1/0246
382/104
2008/0240573 A1 10/2008 Nakamura et al.

FOREIGN PATENT DOCUMENTS

| CN | 108460395 A | 8/2018 |
| JP | 8-247775 A | 9/1996 |
| JP | 2015-21858 A | 2/2015 |
| JP | 5714940 B2 * | 5/2015 |

(Continued)

*Primary Examiner* — Andrae S Allison
*Assistant Examiner* — Emmanuel Silva-Avina
(74) *Attorney, Agent, or Firm* — MASCHOFF BRENNAN

(57) ABSTRACT

A vehicle position determination device mountable to a vehicle, the vehicle position determination device including an acquisition unit that acquires a surrounding image that is road information for identifying a position of the vehicle and is represented by a small displacement with respect to the vehicle, and a control unit that compares the road information with road characteristic information indicating an absolute position of a predetermined point and determines a vehicle position according to a result of the comparison; the road information includes at least one of road shape information indicating a shape of a road surface in a direction of travel of the vehicle and road pattern information indicating a pattern on a road surface.

4 Claims, 3 Drawing Sheets

(56) References Cited

FOREIGN PATENT DOCUMENTS

| | | | |
|---|---|---|---|
| JP | 2019007790 A | * | 1/2019 |
| JP | 6593088 B2 | * | 10/2019 |
| WO | 2016/130719 A2 | | 8/2016 |
| WO | 2018/212292 A1 | | 11/2018 |

* cited by examiner

<COMPARATIVE SURROUNDING IMAGE>

VEHICLE POSITION DETERMINATION DEVICE, VEHICLE POSITION DETERMINATION SYSTEM, AND VEHICLE POSITION DETERMINATION METHOD

CROSS-REFERENCE TO RELATED APPLICATION

This application is the U.S. bypass application of International Application No. PCT/JP2020/014173 filed on Mar. 27, 2020 which designated the U.S. and claims priority to Japanese Patent Application No. 2019-71690 filed on Apr. 4, 2019, the contents of both of which are incorporated herein by reference.

TECHNICAL FIELD

The present disclosure relates to a vehicle position determination device, a vehicle position determination system, and a vehicle position determination method.

BACKGROUND

Examples of known techniques for determining a vehicle position include a technique in which a vehicle position is determined by comparing an image captured by a camera with a sparse map prepared in advance, as described in JP 2018-510373 A.

SUMMARY

An embodiment of the present disclosure provides a vehicle position determination device mountable to a vehicle. The vehicle position determination device is a vehicle position determination device mountable to a vehicle, the vehicle position determination device including an acquisition unit that acquires a surrounding image that is road information for identifying a position of the vehicle and is represented by a small displacement with respect to the vehicle, and a control unit that compares the road information with road characteristic information indicating an absolute position of a predetermined point and determines a vehicle position according to a result of the comparison, the road information includes at least one of road shape information indicating a shape of a road surface in a direction of travel of the vehicle and road pattern information indicating a pattern on a road surface, the surrounding image being represented by displacement with respect to the vehicle at a predetermined time.

BRIEF DESCRIPTION OF THE DRAWINGS

The above objects and other objects, features and advantages of the present disclosure will be made clearer by the following detailed description, given referring to the appended drawings. In the accompanying drawings.

DETAILED DESCRIPTION OF THE PREFERRED EMBODIMENTS

A vehicle position cannot be accurately determined in a place where there are few or no targets serving as landmarks such as signboards or monuments. Thus, demand has grown for a technique capable of accurately determining a vehicle position regardless of the place.

An embodiment of the present disclosure provides a vehicle position determination device mountable to a vehicle. The vehicle position determination device is a vehicle position determination device mountable to a vehicle, the vehicle position determination device including an acquisition unit that acquires a surrounding image that is road information for identifying a position of the vehicle and is represented by a small displacement with respect to the vehicle, and a control unit that compares the road information with road characteristic information indicating an absolute position of a predetermined point and determines a vehicle position according to a result of the comparison, the road information includes at least one of road shape information indicating a shape of a road surface in a direction of travel of the vehicle and road pattern information indicating a pattern on a road surface, the surrounding image being represented by displacement with respect to the vehicle at a predetermined time.

In the vehicle position determination device, the road information for identifying the position of the vehicle that is shown in the surrounding image represented by a small displacement with respect to the vehicle is compared with the road characteristic information indicating an absolute position of a predetermined point, and the vehicle position is determined according to the comparison result. This allows accurate determination of the vehicle position regardless of the place.

A. First Embodiment

Figure 1:
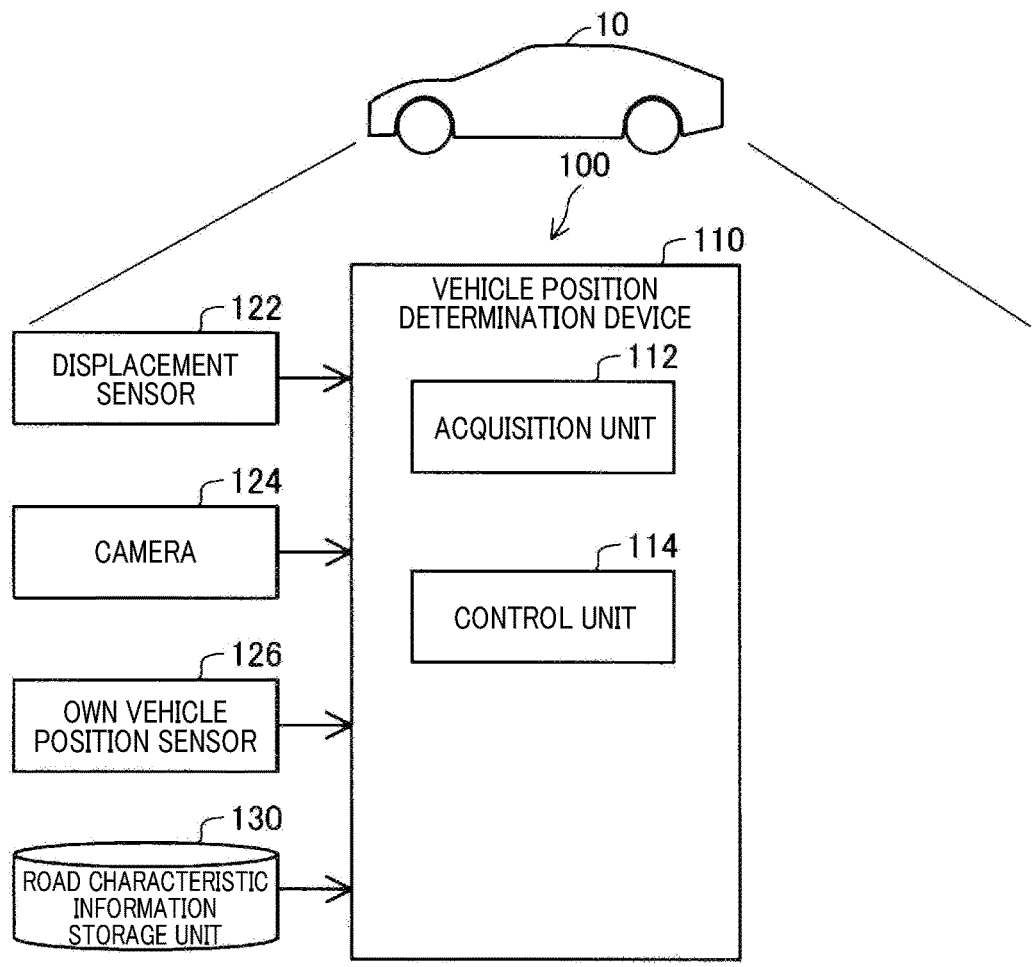
FIG. 1 is an explanatory diagram showing an example of a vehicle to which a vehicle position determination device is mounted.

As shown in FIG. 1, a vehicle 10 is equipped with a vehicle position determination system 100. In the present embodiment, the vehicle position determination system 100 determines a vehicle position that is an absolute position of the vehicle 10 expressed as coordinates on a map. In the present embodiment, the vehicle position determination system 100 includes a vehicle position determination device 110, a displacement sensor 122, a camera 124, a vehicle position sensor 126, and a road characteristic information storage unit 130.

In the present embodiment, the road characteristic information storage unit 130 stores road characteristic information, and landmarks and position information corresponding to the landmarks. The "road characteristic information" is information indicating an absolute position of a predetermined point. The road characteristic information is, for example, information that includes road information on a predetermined point and map coordinate information indicating the point. The "road information" is information for identifying the position of the vehicle.

The road information and the road characteristic information may include, for example, any one or more of the following types of information.

<Information Type 1: Road Shape Information>

Information indicating a shape of a road surface in the direction of travel of the vehicle (specifically, for example, information indicating an undulation of the road surface due to undulating ground)

<Information Type 2: Road Pattern Information>

Information indicating a pattern on the road surface (specifically, for example, information indicating a stain on the road surface or a stone pavement)

<Information Type 3: Distance Mark Information>

Information indicating a distance mark (specifically, for example, information indicating a kilometer post or a milepost)

<Information Type 4: Road Target Information>

Information indicating a stationary target in the vicinity of the road (specifically, for example, information indicating a pattern on the trunk of a roadside tree or an arrangement pattern of roadside trees and fire hydrants)

The information types 1 to 4 may be appropriately combined with other types of information and used as the road information or the road characteristic information.

The vehicle position determination device 110 is composed of, for example, a microcomputer including a central processing unit (CPU), a RAM, and a ROM. The microcomputer executes a program installed in advance, thereby allowing the vehicle position determination device 110 to function as an acquisition unit 112 and a control unit 114. Some or all of the functions of these components may be implemented by a hardware circuit.

The acquisition unit 112 acquires a surrounding image that is the road information and is captured by the displacement sensor 122 and represented by a small displacement with respect to the vehicle 10. The small displacement is, for example, displacement of 1 cm or less. The acquisition unit 112 acquires an image captured by the camera 124 and a vehicle position detected by the vehicle position sensor 126. Furthermore, the acquisition unit 112 acquires road characteristic information stored in the road characteristic information storage unit 130. The control unit 114 compares the road information acquired by the acquisition unit 112 with the road characteristic information and determines the vehicle position according to the comparison result.

The displacement sensor 122 acquires the small displacement with respect to the vehicle 10 as a luminance change signal. The displacement sensor 122 is an event detection imaging device (for example, an event camera) that includes a plurality of pixels composed of a single image pickup device and is capable of detecting, in units of several microseconds, an event that is a change in luminance value of an object caused by displacement of the object. The displacement sensor 122 outputs, as a detection result, information on a changed pixel corresponding to a position at which the luminance value of the object has changed, for example, the intensity of received light or the coordinates of the pixel. The displacement sensor 122 does not output a detection result in frame units obtained by scanning all the plurality of pixels. Thus, by using the detection result obtained by the displacement sensor 122, it is possible to detect road information regardless of the environment in which an image is captured, such as a speed of the vehicle and the degree of brightness around the vehicle. The displacement sensor 122 only needs to be able to output information on a changed pixel whose value has changed according to small displacement of an object with respect to the vehicle 10. Other than an image sensor that does not output a detection signal composed of a frame group, the displacement sensor 122 may be an imaging device capable of outputting a detection signal composed of a frame group at high frame rate, for example, at 1000 fps, at which an image indicating the road information can be captured.

The camera 124 captures an image of the surroundings of the vehicle 10 to acquire the image. The vehicle position sensor 126 detects the current vehicle position of the vehicle 10. The vehicle position sensor 126 may be, for example, a global navigation satellite system (GNSS), a gyro sensor, or the like.

Figure 2:
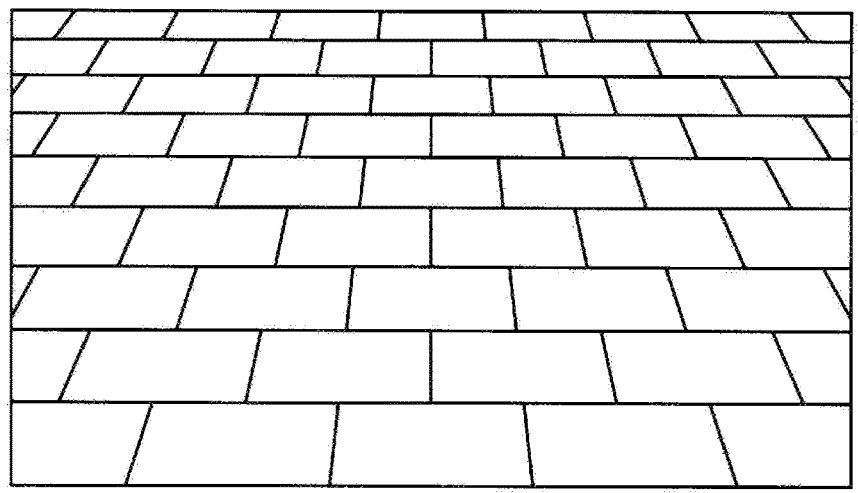
FIG. 2 is a diagram showing an example of a surrounding image.
Figure 3:
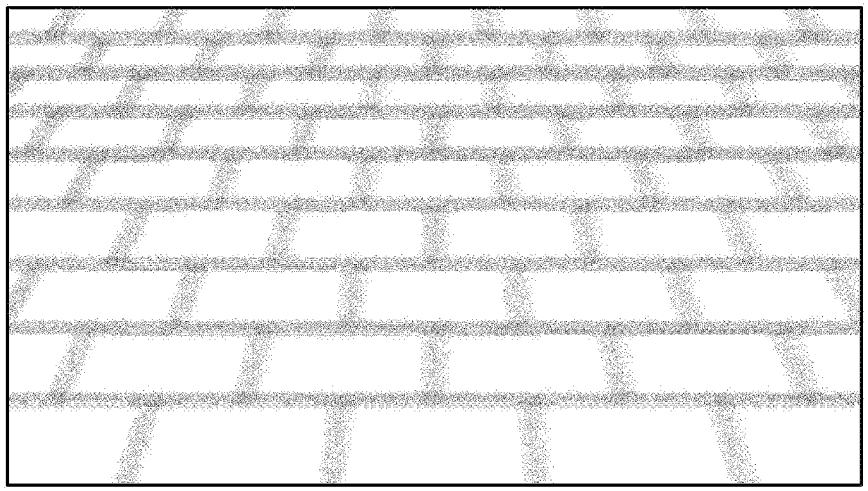
FIG. 3 is a diagram showing a comparative example of the surrounding image.

Images shown in FIGS. 2 and 3 are examples of the surrounding image obtained by capturing images at the same place under the same conditions by using the displacement sensor 122 and the camera 124, respectively. These surrounding images are obtained by capturing images of cobblestone road surface. In the surrounding image in FIG. 2 captured by the displacement sensor 122, no blurring due to movement of the vehicle 10 has occurred; however, in the surrounding image for comparison in FIG. 3 captured by the camera 124, blurring has occurred. As described above, the displacement sensor 122 detects a change in luminance in units of several microseconds; thus, no blurring due to movement of the vehicle 10 occurs even in a surrounding image captured by the displacement sensor 122 at nighttime. In the camera 124, however, the frame rate is, for example, 60 fps, which is low for the moving speed of the vehicle 10, and the exposure time is long for the moving speed of the vehicle 10; thus, blurring may occur in a surrounding image for comparison captured by the camera 124. Therefore, the pattern on the cobblestone is clearer in the surrounding image captured by the displacement sensor 122 than in the surrounding image captured by the camera 124. That is, the vehicle position determination system 100 can acquire definite road information by using the displacement sensor 122.

Figure 4:
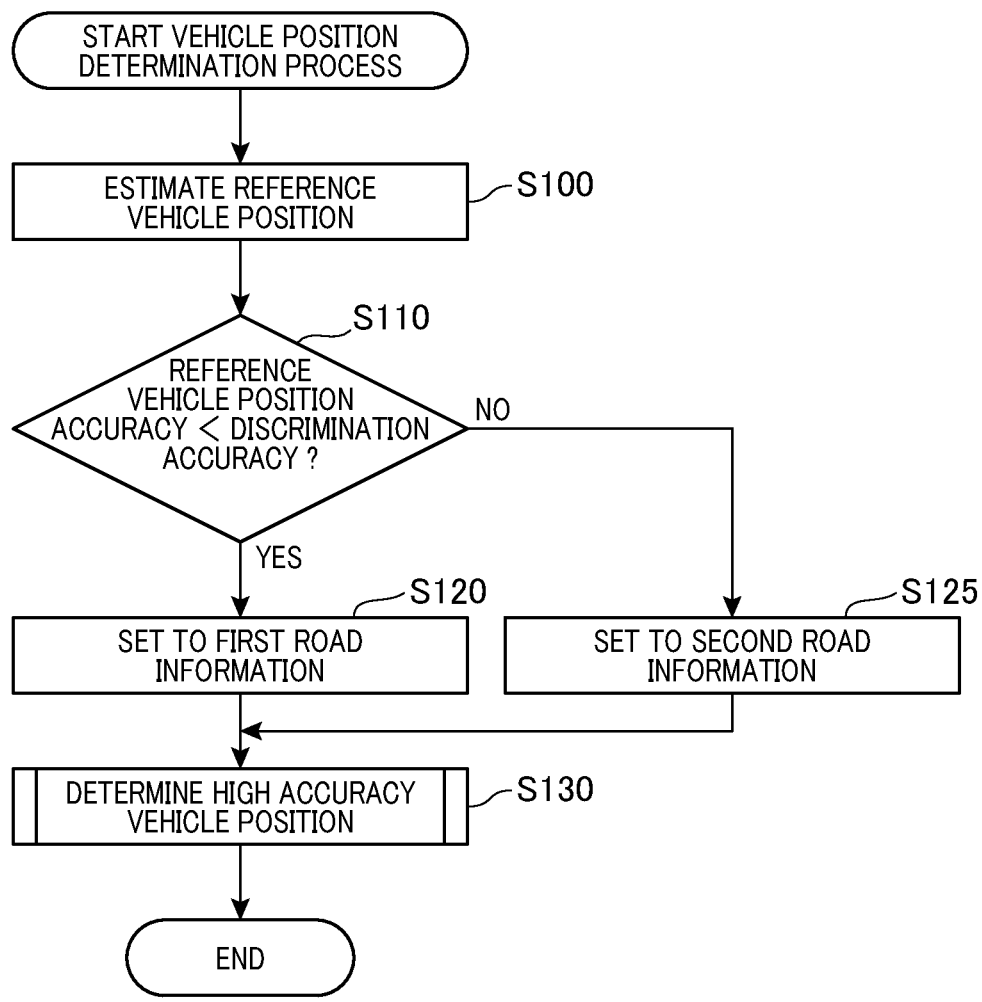
FIG. 4 is a flowchart showing an example of a vehicle position determination process.

A vehicle position determination process shown in FIG. 4 is a process for determining the position of the vehicle 10. This process is repeatedly performed by the vehicle position determination device 110 during operation of the vehicle position determination system 100.

The vehicle position determination device 110 estimates a reference vehicle position (step S100). Specifically, the acquisition unit 112 acquires, as the reference vehicle position, a vehicle position detected by the vehicle position sensor 126. Instead of or in addition to this, the control unit 114 may estimate the reference vehicle position by using information different from the road information by a well-known vehicle position determination technique. For example, the control unit 114 may estimate the reference vehicle position by acquiring, from the road characteristic information storage unit 130, a captured image corresponding to the vehicle position detected by the vehicle position sensor 126, and comparing positions of a landmark included in an image acquired from the camera 124 and a landmark included in the image acquired from the road characteristic information storage unit 130. The image including the landmark and the position information on the landmark that are acquired from the road characteristic information storage unit 130 and used in this step are information for estimating the reference vehicle position, and differ from the road characteristic information.

The vehicle position determination device 110 determines whether an accuracy of the reference vehicle position is less than a predetermined discrimination accuracy (step S110). The accuracy of the reference vehicle position can be obtained, for example, according to a communication intensity of the vehicle position sensor 126, the number of satellites from which radio waves have been received, or an error range at the reference vehicle position estimated by the control unit 114. The discrimination accuracy is a predetermined threshold for determining the accuracy of the vehicle position, and is a value indicating the allowable minimum accuracy. The acquisition unit 112 may acquire the accuracy of a reference vehicle position estimated by using information different from the road information, instead of performing step S100.

When the accuracy of the reference vehicle position is less than the discrimination accuracy (YES in step S110), the control unit 114 performs setting so that a process for determining the vehicle position (described later) is performed by using, as the road information, first road information extracted from a first surrounding image obtained by capturing an image of a first region around the vehicle 10 (step S120). On the other hand, when the accuracy of the reference vehicle position is equal to or greater than the discrimination accuracy (NO in step S110), the control unit 114 performs setting so that the process for determining the vehicle position (described later) is performed by using, as the road information, second road information extracted from a second surrounding image obtained by capturing an image of a second region around the vehicle 10 that is smaller than the first region (step S125). That is, when the accuracy of the reference vehicle position is equal to or greater than the discrimination accuracy, a surrounding image indicating the road information is obtained by capturing an image of a smaller imaging region than when the accuracy of the reference vehicle position is less than the discrimination accuracy. Accordingly, when the accuracy of the reference vehicle position is equal to or greater than the discrimination accuracy, an error range of the vehicle position determined in the process for determining the vehicle position (described later) is smaller than when the accuracy of the reference vehicle position is less than the discrimination accuracy, thus allowing more accurate determination of the vehicle position. When the accuracy is less than the discrimination accuracy, the error range of the vehicle position is large; thus, the use of the first road information on the larger region can absorb the accuracy error of the reference vehicle position. When the accuracy is equal to or greater than the discrimination accuracy, the use of the second road information on the smaller region can achieve accurate determination of the vehicle position. The first surrounding image and the second surrounding image described above are the surrounding images obtained by capturing images of the regions having different sizes; however, the road information may be extracted from regions having different sizes in the same surrounding image.

The control unit 114 determines the vehicle position that is more accurate than the reference vehicle position, and ends the vehicle position determination process (step S130). Details of the method of determining the vehicle position will be described later.

Figure 5:
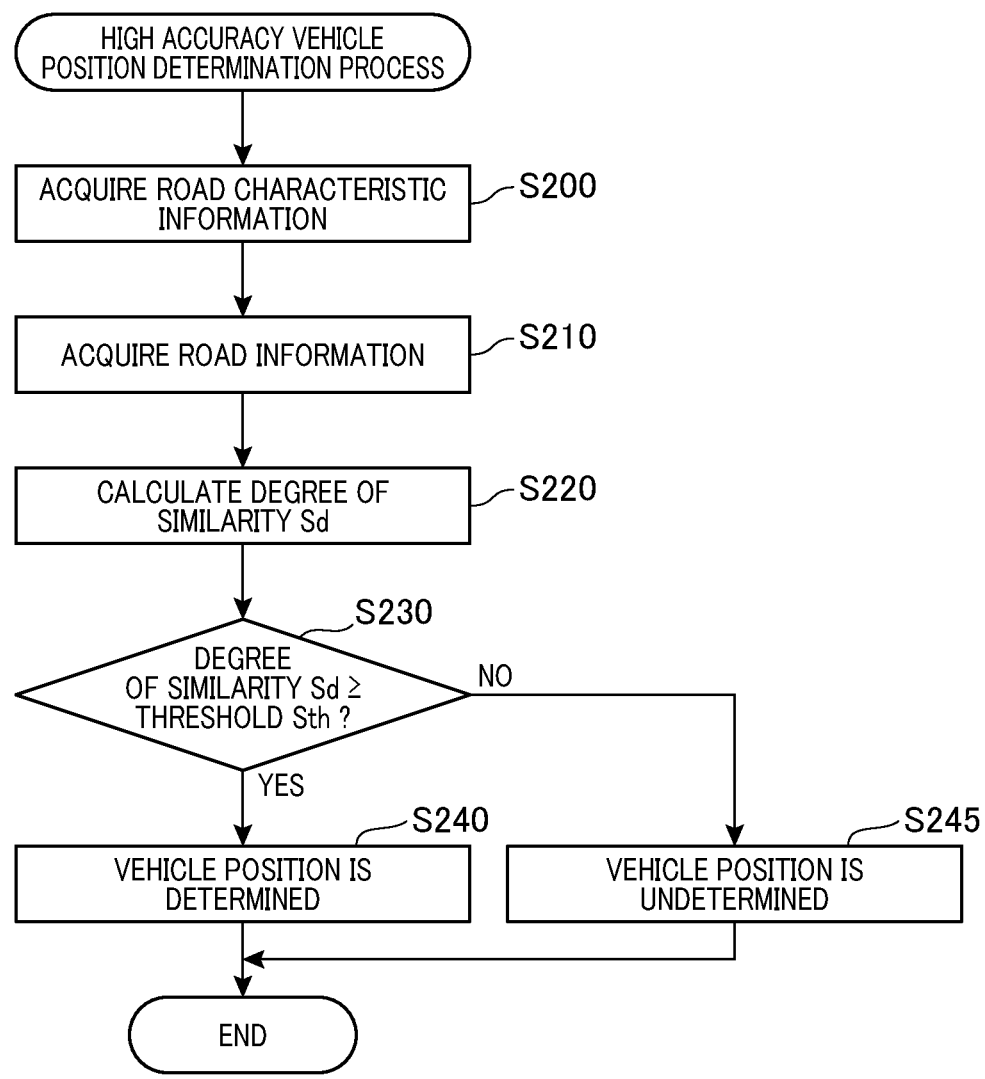
FIG. 5 is a flowchart showing an example of a highly accurate vehicle position determination process.

A highly accurate vehicle position determination process shown in FIG. 5 is a series of processes in which the vehicle position determination device 110 determines the vehicle position in step S130 shown in FIG. 4. The vehicle position may be determined by using only the high accuracy vehicle position determination process shown in FIG. 5, instead of the vehicle position determination process shown in FIG. 4.

The vehicle position determination device 110 acquires road characteristic information from the road characteristic information storage unit 130 (step S200). More specifically, the vehicle position determination device 110 acquires, from the road characteristic information storage unit 130, road characteristic information on an absolute position of a point corresponding to the reference vehicle position.

The vehicle position determination device 110 acquires road information (step S210). More specifically, the acquisition unit 112 acquires a surrounding image as the road information. In the present embodiment, the vehicle position determination device 110 acquires the road information set in the process described above (FIG. 4, step S120, 125). More specifically, the vehicle position determination device 110 acquires the first road information when the accuracy of the reference vehicle position is less than the discrimination accuracy, and the vehicle position determination device 110 acquires the second road information when the accuracy of the reference vehicle position is equal to or greater than the discrimination accuracy. The first road information is, for example, road information extracted from the first surrounding image obtained by capturing an image of the first region that is defined by a distance of 100 m ahead of the vehicle 10 in its direction of travel and a distance of 30 m in the width direction of the vehicle. The second road information is, for example, road information extracted from the second surrounding image obtained by capturing an image of the second region that is defined by a distance of 5 m ahead of the vehicle 10 in its direction of travel and a distance of 1.5 m in the width direction from the vehicle.

Subsequently, the control unit 114 calculates a degree of similarity Sd between the road information and the road characteristic information (step S220). The control unit 114 can obtain the degree of similarity Sd by using a well-known image analysis technique. The control unit 114 may obtain the degree of similarity Sd, for example, by using a pattern matching method or by comparing feature amounts of the images. When the control unit 114 uses road sign information as the road information, the control unit 114 may extract a character string from a kilometer post included in the surrounding image and determine the degree of coincidence between the character strings as the degree of similarity Sd.

The control unit 114 determines whether the calculated degree of similarity Sd is equal to or greater than a predetermined threshold Sth (step S230). For example, when the degree of similarity has a value in the range from 0 to 1, the threshold Sth can be determined to be a value of 0.7 or more. When the degree of similarity Sd is equal to or greater than the threshold Sth (YES in step S230), the control unit 114 determines the vehicle position (step S240). On the other hand, when the degree of similarity Sd is less than the threshold Sth (NO in step S230), the control unit 114 determines that the vehicle position cannot be determined (step S245). The control unit 114 may determine the vehicle position as the reference vehicle position without updating the vehicle position.

In the vehicle position determination device 110 according to the first embodiment described above, the road information for identifying the position of the vehicle 10 that is shown in the surrounding image represented by displacement with respect to the vehicle 10 at a predetermined time is compared with the road characteristic information indicating an absolute position of a predetermined point, and the vehicle position is determined according to the comparison result. This allows accurate determination of the vehicle position regardless of the place. Furthermore, the vehicle position determination device 110 determines, according to the accuracy of the reference vehicle position, the imaging region for the surrounding image indicating the road information used in the vehicle position determination process. When the accuracy of the reference vehicle position is high, a surrounding image indicating the road information is obtained by capturing an image of a smaller imaging region than when the accuracy of the reference vehicle position is low. This achieves a smaller error range of the vehicle position, thus allowing more accurate determination of the vehicle position.

B. Other Embodiments (1) In the above embodiment, the control unit 114 determines, according to the accuracy of the reference vehicle position, the imaging region for the surrounding image indicating the road information used for the process for determining the vehicle position (FIG. 4, step S120, 125). Instead of this, the vehicle position determination device 110 may determine, according to the accuracy of the reference vehicle position, information used as the road information. For example, the vehicle position determination device 110 may be configured to perform setting so that road shape information is used as the road information when the accuracy of the reference vehicle position is less than the discrimination accuracy and that road pattern information is used as the road information when the accuracy of the reference vehicle position is equal to or greater than the discrimination accuracy. More specifically, the vehicle position determination system 100 captures an image of an area in the direction of travel of the vehicle 10 using the displacement sensor 122, so as to capture an image of an undulation of the road surface which is the road shape information or that the displacement sensor 122 captures an image of an area below the vehicle 10 to be able to capture an image of the surface of a stone pavement or the like which is the road pattern information.

(2) In the above embodiment, the control unit 114 determines the vehicle position depending on whether the degree of similarity Sd is equal to or greater than the threshold Sth (FIG. 5, step S240, 245). Instead of this, the control unit 114 may calculate the degree of similarity Sd between the road information and each of a plurality of pieces of road characteristic information, and determine, as the vehicle position, a position indicated by the road characteristic information having the highest degree of similarity Sd. Furthermore, when the control unit 114 uses road sign information as the road information, the control unit 114 may extract a kilometer post included in the surrounding image and compare the kilometer post with the road characteristic information to identify a point indicated by the kilometer post, and determine the vehicle position according to the distance to the kilometer post.

The present disclosure has been described based on the embodiments and modifications. The above-described embodiments of the invention are intended to facilitate understanding of the present disclosure, and do not limit the present disclosure. The present disclosure may be modified or improved without departing from the gist or the claims of the present disclosure, and the present disclosure includes equivalents thereof. For example, in order to solve some or all of the problems described above or to achieve some or all of the effects described above, replacement or combination may be performed as appropriate in the technical features in the embodiments and modifications corresponding to the technical features in each embodiment described in summary of the invention. Unless the technical features are described as essential in the present specification, the technical features may be deleted as appropriate.

What is claimed is:

1. A vehicle position determination device mountable to a vehicle, the vehicle position determination device comprising:
an acquisition unit that acquires a surrounding image that is road information for identifying a position of the vehicle and is represented by a small displacement with respect to the vehicle; and
a control unit that compares the road information with road characteristic information indicating an absolute position of a predetermined point and determines a vehicle position according to a result of the comparison; wherein
the road information includes at least one of road shape information indicating a shape of a road surface in a direction of travel of the vehicle and road pattern information indicating a pattern on a road surface,
the acquisition unit acquires an accuracy of a vehicle position estimated by using information different from the road information, and
the control unit is configured to
when the accuracy is less than a predetermined discrimination accuracy, determine the vehicle position by using, as the road information, first road information extracted from a first surrounding image obtained by capturing an image of a first region around the vehicle, and
when the accuracy is equal to or greater than the discrimination accuracy, determine the vehicle position by using, as the road information, second road information extracted from a second surrounding image obtained by capturing an image of a second region around the vehicle, the second region being smaller than the first region.

2. The vehicle position determination device according to claim 1, wherein
the road information includes road sign information indicating a distance mark.

3. A vehicle position determination system mountable to a vehicle, the vehicle position determination system comprising:
an acquisition unit that acquires a surrounding image that is road information for identifying a position of the vehicle and is represented by a small displacement with respect to the vehicle;
a control unit that compares the road information with road characteristic information indicating an absolute position of a predetermined point and determines a vehicle position according to a result of the comparison; and
a displacement sensor that outputs the surrounding image, wherein
the displacement sensor is configured to acquire the small displacement as a luminance change signal,
the acquisition unit acquires an accuracy of a vehicle position estimated by using information different from the road information, and
the control unit is configured to
when the accuracy is less than a predetermined discrimination accuracy, determine the vehicle position by using, as the road information, first road information extracted from a first surrounding image obtained by capturing an image of a first region around the vehicle, and
when the accuracy is equal to or greater than the discrimination accuracy, determine the vehicle position by using, as the road information, second road information extracted from a second surrounding image obtained by capturing an image of a second region around the vehicle, the second region being smaller than the first region.

4. A vehicle position determination method comprising:

acquiring a surrounding image that is road information for identifying a position of a vehicle and is represented by a small displacement with respect to the vehicle; and comparing the road information with road characteristic information indicating an absolute position of a predetermined point and determining a vehicle position according to a result of the comparison; wherein the road information includes at least one of road shape information indicating a shape of a road surface in a direction of travel of the vehicle and road pattern information indicating a pattern on a road surface, an accuracy of a vehicle position is acquired which is by estimated by using information different from the road information, and wherein based on the accuracy being less than a predetermined discrimination accuracy, the vehicle position is determined by using, as the road information, first road information extracted from a first surrounding image obtained by capturing an image of a first region around the vehicle, and based on the accuracy being equal to or greater than the discrimination accuracy, the vehicle position is determined by using, as the road information, second road information extracted from a second surrounding image obtained by capturing an image of a second region around the vehicle, the second region being smaller than the first region.

* * * * *